(12) United States Patent
Mullen et al.

(10) Patent No.: US 10,833,859 B2
(45) Date of Patent: Nov. 10, 2020

(54) AUTOMATING VERIFICATION USING SECURE ENCRYPTED PHONE VERIFICATION

(71) Applicant: International Business Machines Corporation, Armonk, NY (US)

(72) Inventors: Shawn P. Mullen, Buda, TX (US); Elvin Dalipe Tubillara, Austin, TX (US); Karen Mariela Siles, Austin, TX (US); Nithya Alagu Renganathan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 187 days.

(21) Appl. No.: 15/834,905

(22) Filed: Dec. 7, 2017

(65) Prior Publication Data
US 2019/0182044 A1 Jun. 13, 2019

(51) Int. Cl.
| | |
|---|---|
| *H04L 29/06* | (2006.01) |
| *H04L 9/30* | (2006.01) |
| *G06Q 20/32* | (2012.01) |
| *H04W 4/029* | (2018.01) |
| *H04L 9/32* | (2006.01) |
| *H04L 9/08* | (2006.01) |

(52) U.S. Cl.
CPC ....... *H04L 9/3073* (2013.01); *G06Q 20/3278* (2013.01); *H04L 9/0863* (2013.01); *H04L 9/3247* (2013.01); *H04L 9/3271* (2013.01); *H04L 9/3273* (2013.01); *H04W 4/029* (2018.02); *H04L 2209/127* (2013.01)

(58) Field of Classification Search
CPC ... H04L 9/3073; H04L 9/0863; H04L 9/3247; H04L 9/3273; H04L 9/0897; H04L 9/3234; H04L 2209/127; H04L 9/3271; H04W 4/029; G06Q 20/3278; G06Q 20/3263; G06F 21/57; G06F 21/64
See application file for complete search history.

(56) References Cited

U.S. PATENT DOCUMENTS

| | | |
|---|---|---|
| 8,893,237 B2 | 11/2014 | Ganesan |
| 9,083,531 B2 | 7/2015 | Chenna |

(Continued)

FOREIGN PATENT DOCUMENTS

WO WO-2017131775 A1 * 8/2017 ........... G06F 21/577

*Primary Examiner* — Yogesh Paliwal
(74) *Attorney, Agent, or Firm* — Schmeiser, Olson & Watts, LLP; Michael P. O'keefe

(57) ABSTRACT

A encrypted verification system and method includes detecting an attempt to access a service requiring multi-factor authentication from a first user computing device, requesting a trusted platform module (TPM) public key of a second user computing device, the second user computing device being coupled to the first user computing device, generating a nonce in response to receiving the TPM public key of the second user computing device, sending the nonce for signature by a TPM private key of the second user computing device, receiving a signed nonce, wherein the signed nonce is signed by the TPM private key and decrypted using the TPM public key of the second user computing device, and determining that a value of the signed nonce matches a value of the nonce to authenticate the first user computing device and allowing access to the service.

17 Claims, 8 Drawing Sheets

(56) References Cited

U.S. PATENT DOCUMENTS

| | | | |
|---|---|---|---|
| 2002/0026575 A1* | 2/2002 | Wheeler | G06Q 20/00 713/156 |
| 2009/0119754 A1* | 5/2009 | Schubert | H04L 63/0853 726/4 |
| 2016/0086176 A1 | 3/2016 | Silva Pinto et al. | |
| 2016/0232344 A1* | 8/2016 | Chung | G06F 21/6281 |
| 2017/0180314 A1 | 6/2017 | Walker et al. | |
| 2017/0207920 A1 | 7/2017 | Camenisch et al. | |

* cited by examiner

AUTOMATING VERIFICATION USING SECURE ENCRYPTED PHONE VERIFICATION

TECHNICAL FIELD

The present invention relates to systems and methods for encrypted phone verification, and more specifically the embodiments of an encrypted verification system for automatic and secure verification of a user using encrypted phone verification.

BACKGROUND

Various services require multi-factor authentication of a device attempting to access the service.

SUMMARY

An embodiment of the present invention relates to a method, and associated computer system and computer program product, for automatic and secure verification of a user using encrypted phone verification. A processor of a computing system detects an attempt to access a service requiring multi-factor authentication from a first user computing device. A trusted platform module (TPM) public key of a second user computing device is requested. A nonce is generated and sent for signature by a TPM private key of the second user computing device. A signed nonce is received, wherein the signed nonce is signed by the TPM private key and decrypted using the TPM public key of the second user computing device. A value of the signed nonce is determined to match a value of the nonce to authenticate the first user computing device and allowing access to the service.

DETAILED DESCRIPTION

Various services require a multi-factor verification process to authenticate a device attempting to access the service. One type of multi-factor authentication method is a 2-factor authentication method that sends a verification code via short message service (SMS), such as a text message to a user's phone. The user is then required to type the verification code into an authentication page of that service. The service may enforce this type of 2-factor authentication periodically or when the service is being accessed by the user via a new or unrecognized computing device. A 2-factor authentication method can be a strong authentication method because the 2-factor authentication method is dependent on "what the user knows" and "what the user has." For instance, the 2-factor authentication method requires a password (e.g. "what the user knows") and also requires that the user have the user's phone relating to a registered phone number (e.g. what the user has"). The 2-factor authentication method may verify that the user has possession of the phone by sending a verification code to the user's registered phone. After receiving the verification code, the user types the verification code into a web page associated with the service. A backend system of the service may then compare the verification code received from the web page to the verification code sent to the user's phone. A match verifies the "what the user has" portion of the 2-factor authentication. However, this method is very manual and relies on one of the most basic and also least secure features of smart phones: SMS and voice.

Embodiments of the present invention fixes both of these problems by fully automating the verification process and increasing a computer security of the authentication process between a user device and a service.

Figure 1:
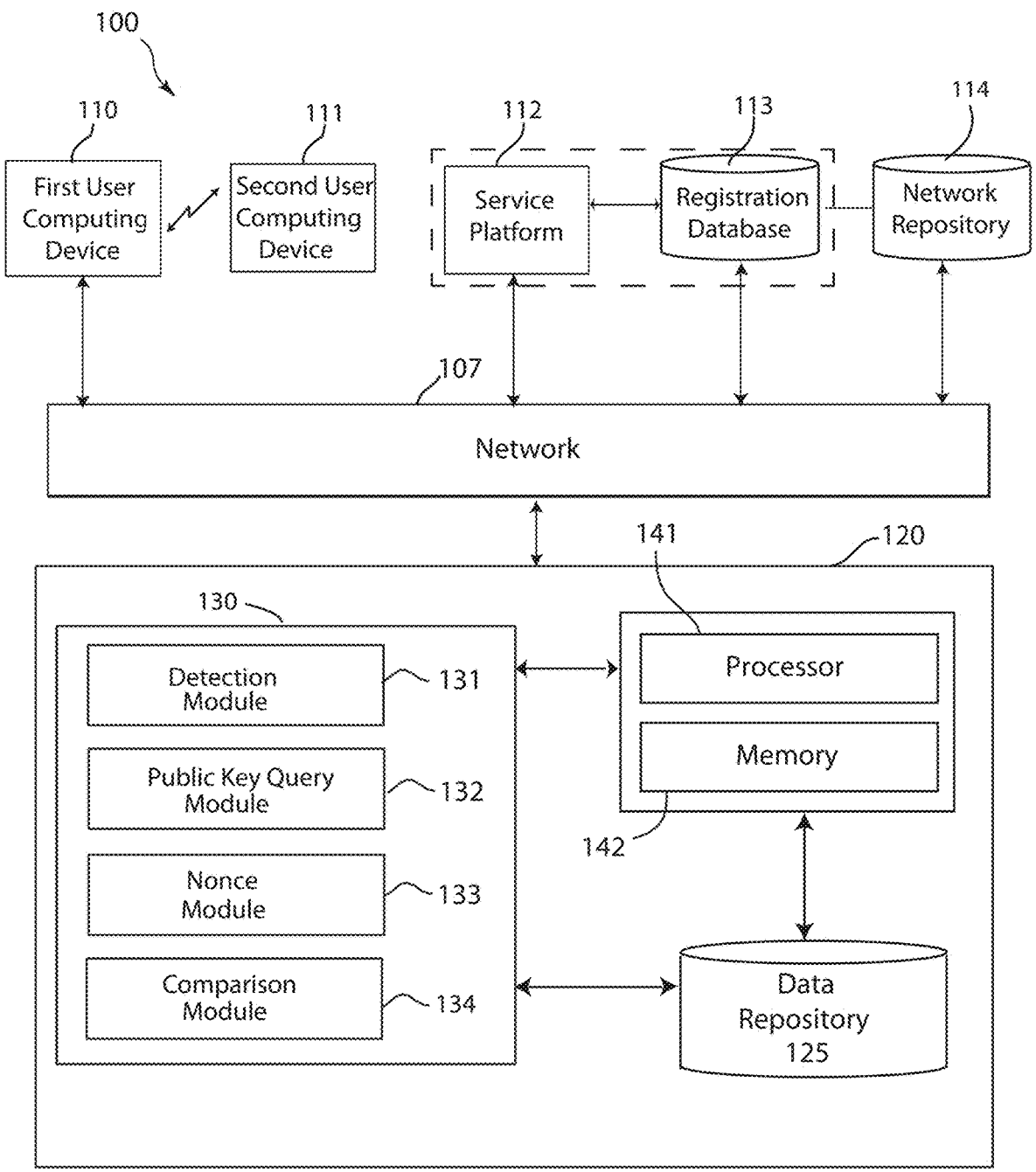
FIG. 1 depicts a block diagram of an encrypted verification system, in accordance with embodiments of the present invention.

Referring to the drawings, FIG. 1 depicts a block diagram of encrypted verification system 100, in accordance with embodiments of the present invention. Embodiments of the encrypted verification system 100 may be a system for automatic and secure verification of a user using encrypted phone verification. Embodiments of the encrypted verification system 100 may be useful for users and service providers to automate the verification/authentication process of a user device attempting to access the service, while also provide a secure method to transmit sensitive information. Embodiments of the encrypted verification system 100 may be a an encrypted phone verification system, a multi-factor authentication system, a secure multi-factor authentication system, an automated multi-factor authentication system, a secure automated verification system, a secure and automated authentication system, an encrypted verification system, and the like. Embodiments of the encrypted verification system 100 may include a computing system 120. Embodiments of the computing system 120 may be a computer system, a computer, a server, one or more servers, a cloud computing device, a hardware device, a remote server, and the like. Embodiments of the computing system 120 may be associated with a service or service platform 111, as described in greater detail infra.

Furthermore, embodiments of encrypted verification system 100 may include an first user computing device 110, a second user computing device 111 coupled to the first user computing device 110, a service platform 112, and a registration database 113, communicatively coupled to a computing system 120 of the protective action system 100 over a network 107. For instance, information/data may be transmitted to and received from the first user computing device 110, the second user computing device 111 coupled to the first user computing device 110, the service platform 112, and the registration database 113, over a network 107. A network 107 may be the cloud. Further embodiments of network 107 may refer to a group of two or more computer systems linked together. Network 107 may be any type of computer network known by individuals skilled in the art. Examples of computer networks 107 may include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA or a mobile communications data network. The architecture of the computer network 107 may be a peer-to-peer network in some embodiments, wherein in other embodiments, the network 107 may be organized as a client/server architecture.

In some embodiments, the network 107 may further comprise, in addition to the computing system 120, a connection to one or more network-accessible knowledge bases, such as network repository 114, containing information of the first user computing device, the second user computing device, an account activity, a frequency of service access, etc., network repositories 114 or other systems connected to the network 107 that may be considered nodes of the network 107. In some embodiments, where the computing system 120 or network repositories allocate resources to be used by the other nodes of the network 107, the computing system 120 and network repository 114 may be referred to as servers.

The network repository 114 may be a data collection area on the network 107 which may back up and save all the data transmitted back and forth between the nodes of the network 107. For example, the network repository 114 may be a data center saving and cataloging information of the first user computing device, the second user computing device, an account activity, a frequency of service access, and the like, to generate both historical and predictive reports regarding an verification of a user device accessing the service platform 111. In some embodiments, a data collection center housing the network repository may include an analytic module capable of analyzing each piece of data being stored by the network repository 114. Further, the computing system 120 may be integrated with or as a part of the data collection center housing the network repository 114. In some alternative embodiments, the network repository 114 may be a local repository that is connected to the computing system 120.

Embodiments of the first user computing device 110 of the encrypted verification system 100 may be a user device, a user mobile device, a mobile computer, a tablet computer, a PDA, a smartwatch, a dedicated mobile device, a streaming device, an internet connected speaker, a digital assistant, a digital media player, a console, a gaming device, a smart appliance, a desktop computer, a laptop computer, or other internet accessible device, machine, or hardware. The first user computing device 110 may be running one or more service platform applications. Embodiments of the first user computing device 110 may connect to or otherwise communication with the computing system 120 over network 107.

Furthermore, embodiments of the encrypted verification system 100 may include a second user computing device 111. Embodiments of the second user computing device 111 may be coupled to the first user computing device 110. For example, embodiments of the second user computing device 111 may be connected, paired, linked, or otherwise coupled to the first user computing device 110 for communication therebetween. In an exemplary embodiment, the second user computing device 111 may be coupled to the first user computing device over a short range wireless communication. In another exemplary embodiment, the second user computing device 111 may be coupled to the first user computing device 110 via a wired connection, such as an Ethernet connection, universal serial bus (USB) connection, high-definition multimedia interface (HDMI), and the like. Moreover, embodiments of the second user computing device 111 may be a phone, a mobile phone, a smartphone, a cellular phone, a cellular device, a communication device, and the like, that can be registered to a user of the first computing device 110 attempting to access the service.

Figure 2:
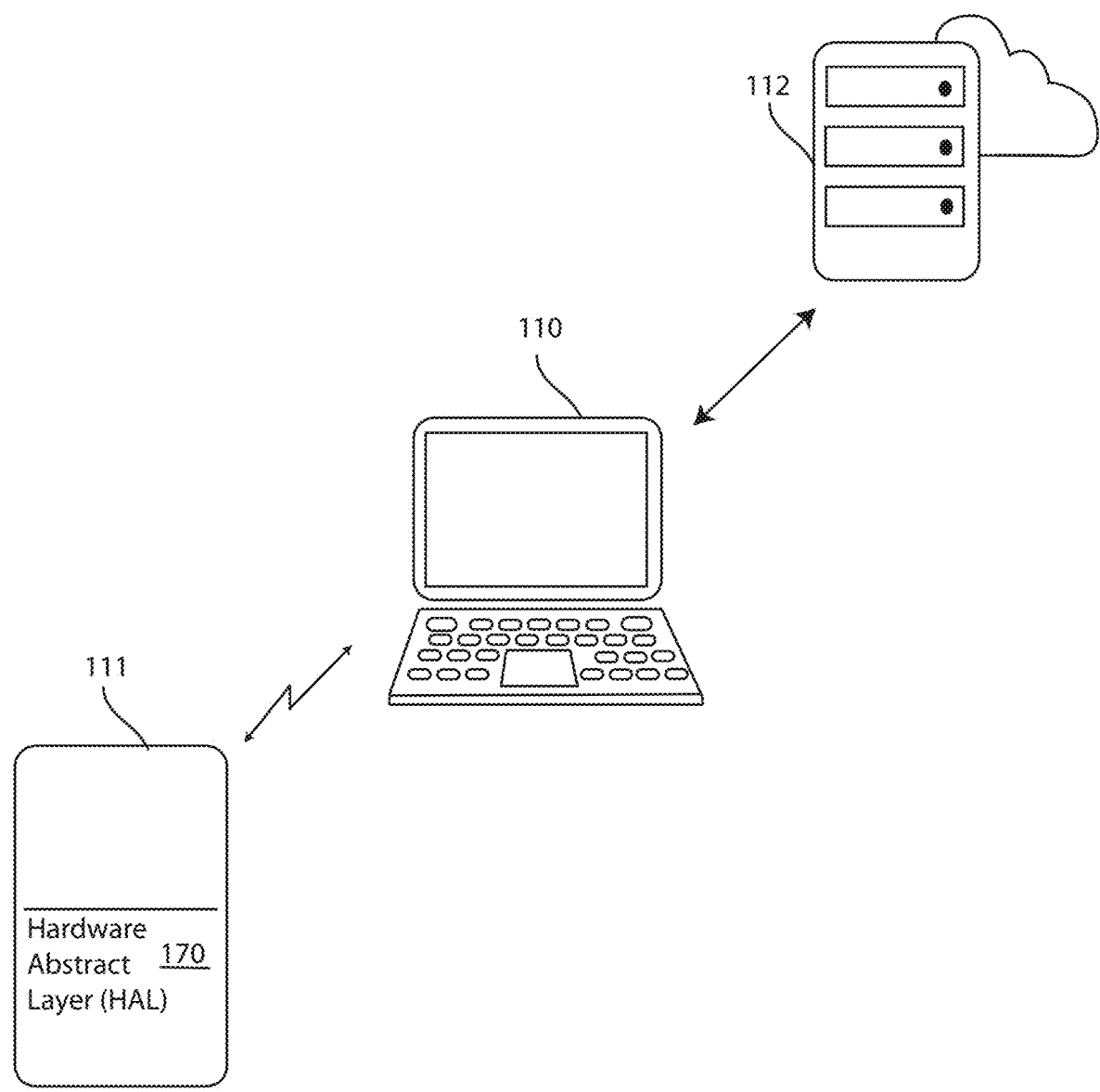
FIG. 2 depicts a schematic view of a first user computing device, a second user computing device, and a services platform, being connected to each other, in accordance with embodiments of the present invention.

FIG. 2 depicts a schematic view of a first user computing device 110, a second user computing device 111, and a service platform 112, being connected to each other, in accordance with embodiments of the present invention. Embodiments of the second user computing device 111 may include a Hardware Abstract Layer (HAL) 170, which can be considered the most secure region of the second user computing device 111. The HAL 170 may bridge a gap between hardware and software. Software within the HAL 170 may contain the most secure and sensitive functionality of the phone, such as: a payment system, Near Field Communication (NFC). HAL 170 may implement the functionality of a trusted platform module (TPM). Alternatively, the second user computing device 111 may include a chip that supports the TPM. A TPM of the second user computing device 111 may include a TPM private key and a TPM public key. In an exemplary embodiment, the TPM private key and the TPM public key is embedded in the TPM implemented by the HAL 170. Embodiments of the TPM may have many functions supporting a capability for integrity checking.

Referring now to FIGS. 1 and 2, embodiments of the encrypted verification system 100 may include a service platform 112. Embodiments of the services platform may be one or more databases, storage devices, repositories, servers, computers, engines, websites, programs, applications, and and/or a combination thereof, that may service, run, etc. a service. Embodiments of a service may be an email account application, a bank account application, an entertainment media application, an over-the-top (OTT) application for streaming content, video on-demand service, an email server, a cloud service, an enterprise service management software, a social media account, a social network account, and the like. The service platform 112 may be accessed or may share a communication link over network 107, and may be managed and/or controlled by a third party. In an exemplary embodiment, the services platform 112 may require a multi-factor authentication for accessing, utilizing, viewing, streaming, or otherwise using the service associated with the service platform 112. The multi-factor authentication/verification process may be prompted when a new or recognized computing device attempts to access, view, stream, or otherwise use the service associated with the service platform 112. In addition, a multi-factor authentication process may be performed periodically and/or randomly to maintain a higher level of security. Aspects of the service platform 112 may be accessible by the computing system 120, and the first user computing device 110.

Embodiments of the encrypted verification system 100 may also include a registration database 113. Embodiments of the registration database 113 may be may be one or more databases, storage devices, repositories, and the like, that may store or otherwise contain information and/or data regarding registration information, including user data, user identification information, user password information associated with an account or profile stored on the registration database 113, GPS or satellite receiver links/information, a TPM public key information, a user preference information, and the like. For instance, a user may register a user phone, such as second user computing device 111, with the registration database 113, so that when a user attempts to access a service associated with services platform 112, the computing system 120 may access or otherwise query the registration database 113 to obtain phone information which may be used to retrieve or request the TPM public key of the user phone. Moreover, the registration database 113 may contain user preferences, such as a method authentication. The user may indicate via the service platform 111 that the user desires to use an encrypted phone verification method as described herein, wherein the preferred method may be stored in the registration database 113 for further automating the multi-factor authentication process. Embodiments of the registration database 113 may also store computing devices that are registered with the service. For example, after a successful login attempt using a streaming device of the user, the streaming device identification information may be stored in the registration database 113 so that the streaming device of the user may be recognized by the computing system 120 during subsequent login attempts.

Further, embodiments of the computing system 120 may be equipped with a memory device 142 which may store various data/information/code, and a processor 141 for implementing the tasks associated with the encrypted verification system 100. In some embodiments, an encrypted verification application 130 may be loaded in the memory 142 of the computing system 120. The computing system 120 may further include an operating system, which can be a computer program for controlling an operation of the computing system 120, wherein applications loaded onto the computing system 120 may run on top of the operating system to provide various functions. Furthermore, embodiments of computing system 120 may include the encrypted verification application 130. Embodiments of the encrypted verification application 130 may be an interface, an application, a program, a module, or a combination of modules. In an exemplary embodiment, the encrypted verification application 130 may be a software application running on one or more servers, servicing multiple computing devices, etc.

Referring back to FIG. 1, embodiments of the encrypted verification application 130 of the computing system 120 may include a detection module 131, a public key query module 132, a nonce module 133, and a comparison action module 134. A "module" may refer to a hardware-based module, software-based module or a module may be a combination of hardware and software. Embodiments of hardware-based modules may include self-contained components such as chipsets, specialized circuitry and one or more memory devices, while a software-based module may be part of a program code or linked to the program code containing specific programmed instructions, which may be loaded in the memory device of the computing system 120. A module (whether hardware, software, or a combination thereof) may be designed to implement or execute one or more particular functions or routines.

Embodiments of the detection module 131 may include one or more components of hardware and/or software program code for detecting an attempt to access a service requiring multi-factor authentication from a first user computing device 110. For instance, embodiments of the detection module 131 may detect that a first computing device 110 is attempting to login, access, use, view, or otherwise use a service associated with the service platform 112. In an exemplary embodiment, the detection module 131 may query or otherwise access the registration database 113 to determine whether the first user computing device 110 is registered and/or recognizable. If the first user computing device 110 is not recognized and/or is a new computing device the user is using to access the service, a multi-factor authentication process may be prompted by the computing system 120. The detection module 131 may further determine that the user, based on user preferences or settings associated with the service account, desires to use the encrypted verification method implemented by the encrypted verification application 130. In an exemplary embodiment, the user may select an option for verification. Alternatively, the detection module 131 may automatically decide or determine that the user prefers to use an encrypted phone verification method. If the first user computing device 110 is recognized and/or is not a new computing device the user is using to access the service, a multi-factor authentication process may still be prompted by the computing system 120. For instance, the detection module 131 may determine a length of time since the last time the first user computing device 110 has been authenticated using the encrypted verification application 130, and may determine that the length of time exceeds a threshold of time between multi-factor authentication of the first user computing device 110 (e.g. every 2 weeks, 2 months, 6 months, etc.) In other embodiments, the authentication/verification method may be performed randomly, periodically, variably periodically, etc. In yet another embodiment, the multi-factor authentication method performed by computing system 120 running the encrypted verification application 130 may be performed each time a first user computing device 110 attempts to login, access, view, or otherwise use the service because the multi-factor authentication method may be performed automatically without requiring any physical operation/activity of the user. In some embodiments, the detection module 131 may continuously monitor the service platform 112 for access attempts, and may require multi-factor authentication for each device for each access attempt.

Figure 3:
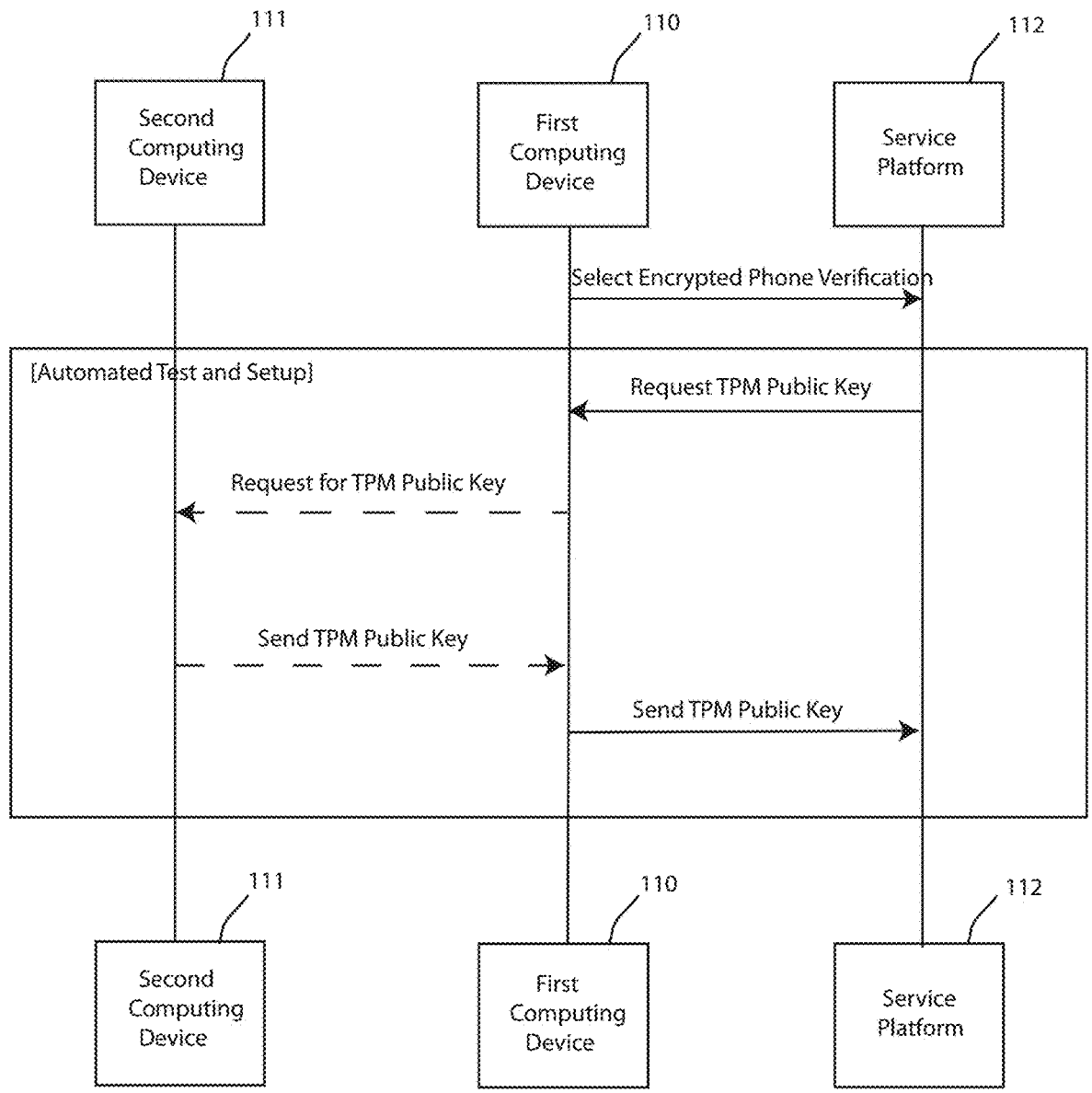
FIG. 3 depicts a schematic diagram of a first portion of a multi-factor authentication process, in accordance with embodiments of the present invention.

Embodiments of the computing system 120 may further include public key query module 132. Embodiments of the public key query module 132 may include one or more components of hardware and/or software program code for requesting a trusted platform module (TPM) public key of a second user computing device 111. For instance, include public key query module 132 may retrieve the TPM public key of the TPM, the functionality of which being implemented by the HAL 170 of the second user computing device 111. FIG. 3 depicts a schematic diagram of a first portion of a multi-factor authentication process, in accordance with embodiments of the present invention. Embodiments of the public key query module 132 may send a request for the TPM public key over network 107 (e.g. internet connection) to the first user computing device 110 that attempted the access to the service. In response, the first user computing device 110 may send a request to the second computing device 111 for the TPM public key over a separate communication channel, such as a short range wireless communication network (e.g. Bluetooth® network). The second user computing device 111 may respond to the request by sending the TPM public key to the first user computing device 110 over the same, separate communication path between the first user computing device 110 and the second user computing device 111. The first user computing device 110 may then send the TPM public key to the public key query module 132 of the computing system 120, over network 107.

In alternative embodiments, the public key query module 132 may communicate directly with the second user computing device 111 to obtain, retrieve, query, or otherwise receive the TPM public key of the second user computing device 111.

Referring back to FIG. 1, embodiments of the computing system 120 may include a nonce module 133. Embodiments of the nonce module 133 may include one or more components of hardware and/or software program code for generating a nonce. In an exemplary embodiment, the nonce may be generated in response to receiving the TPM public key of the second user computing device 111. Embodiments of the nonce module 133 may generate a cryptographic nonce for use in the multi-factor authentication process. The nonce may be generated or otherwise created in response to receiving the TPM public key from the first user computing device 110, or in response to retrieving the known TPM public key from the registration database 113. Even further embodiments of the nonce module 133 may generate the nonce prior to or simultaneously with receiving and/or requesting the TPM public key. Embodiments of the nonce may be a nonce, a cryptographic nonce, and the like, that may be a random number generated for a single use during authentication protocols.

Figure 4:
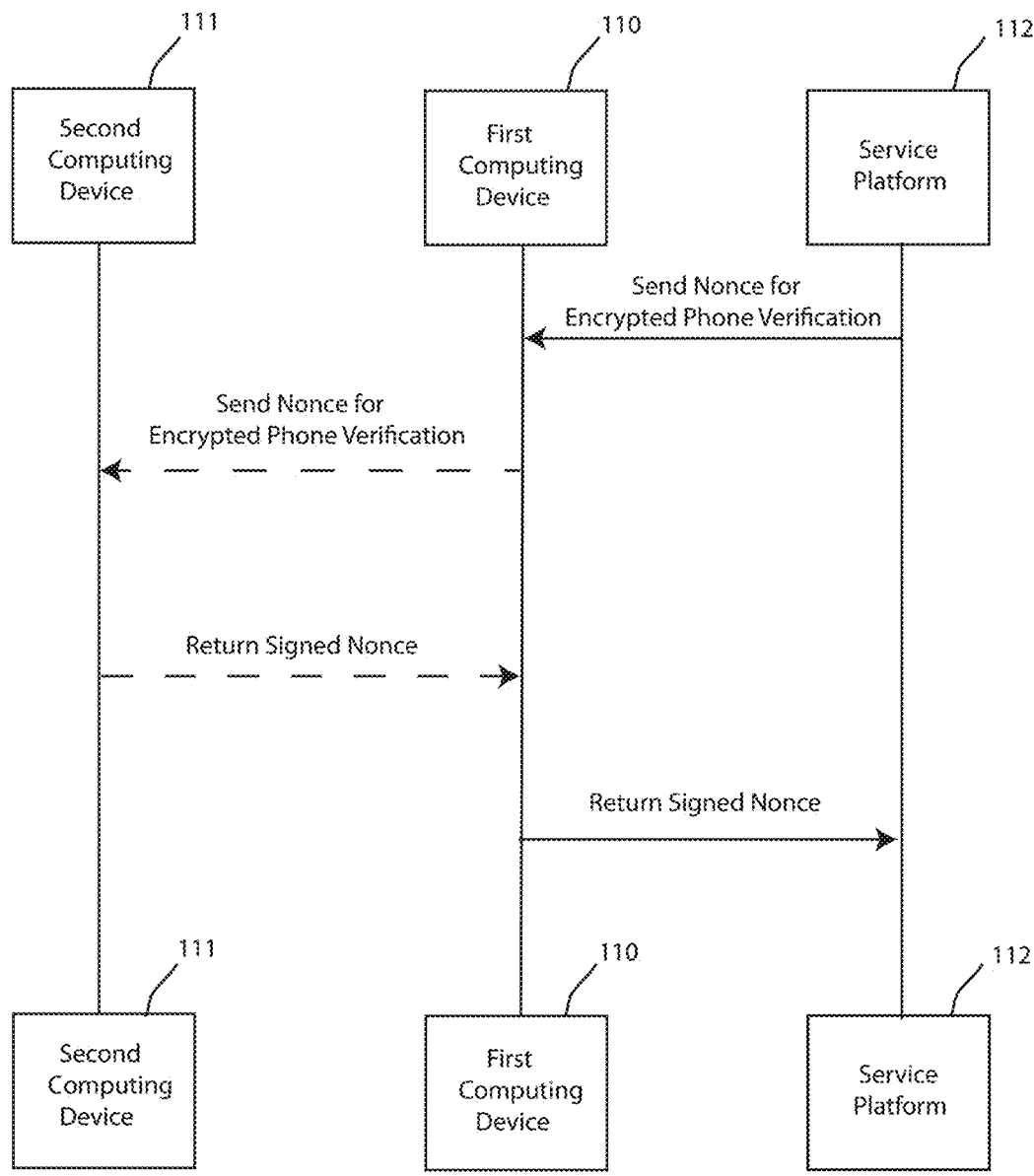
FIG. 4 depicts a schematic diagram of a second portion of a multi-factor authentication process, in accordance with embodiments of the present invention.

FIG. 4 depicts a schematic diagram of a second portion of a multi-factor authentication process, in accordance with embodiments of the present invention. Embodiments of the nonce module 133 may send the nonce for signature by a TPM private key of the second user computing device 111. The TPM private key is never exposed and thus secure and only known to the TPM implemented by the HAL 170 of the second user computing device 111. Embodiments of the nonce module 133 may call the TPM to sign the nonce data as part of sending the nonce for signature by the TPM private key. For example, embodiments of the nonce module 133 may send a random number (e.g. nonce) to a signing function of the TPM of the second user computing device 111, so that the signing function signs the data with the TPM private key. The signed nonce may also be referred to an encrypted nonce because the act of signing the nonce with the TPM private key may encrypt the nonce. The nonce may be signed by the TPM private key or the HAL 170 private key, such that the TPM private key is never exposed. For instance, the actual signing of the nonce may be performed within the TPM of the HAL 170, which means that the TPM private key may never be exposed or shared. Further, the secure nature of the TPM private key signing a nonce generated and sent by the computing system 120 in the HAL 170 protects the private key while also sending back a signed nonce which may not include any data of the private key, but rather a decrypted nonce. Thus, if the signed, encrypted nonce is altered along a return path from the second user computing device 111 to the first user computing device 112, and/or from the first user computing device 110, the verification of the first user computing device 110 will fail. A replay of a captured signed nonce may be useless because a nonce may not be repeated with any frequency and typically are only valid for a short window of time before the nonce expires.

Furthermore, embodiments of the nonce module 133 may receive the signed nonce, wherein the signed nonce is signed by the TPM private key and decrypted using the TPM public key of the second user computing device 111. For instance, embodiments of the nonce module 133 may decrypt the signed, encrypted nonce using the TPM public key of the TPM of the second user computing device 111, which may correspond to the TPM private key of the TPM of the second user computing device 111. The nonce module 133 of the computing system 120 may decrypt the signed value with the TPM public key, which may yield a returned-nonce.

As shown in FIG. 4, embodiments of the nonce module 133 of the computing system may send the unsigned, generated nonce to the first user computing device 110 over network 107. The first user computing device 110 may then send the nonce to the second user computing device 111 over a separate communication channel (e.g. short range wireless communication network, USB, HDMI, etc.) Embodiments of the second user computing device 111 may then send the signed nonce to the first user computing device 110 over the separate communication channel. The first user computing device 110 may then send the signed, encrypted nonce to the computing system 120. In alternative embodiments, the nonce module 133 may communicate directly with the second user computing device 111 over network 107.

Referring again to FIG. 1, embodiments of the computing system 120 may include a comparison action module 134. Embodiments of the comparison module 134 may include one or more components of hardware and/or software program code for determining that a value of the signed nonce matches a value of the nonce to authenticate the first user computing device and allowing access to the service. For instance, the signed nonce is decrypted with the TPM public key, which may yield a returned-nonce. The returned nonce may have a value, and if the value of the returned nonce matched a value of the sent nonce, then the comparison module 134 may determine that the returned nonce came from the second user computing device 111, which is a known device to be possessed by a user operating the first computing device 110. In other words, the comparison module 134 may compare a value of the returned nonce with a value of the generated and sent nonce to determine whether the values match. In the event of a match, the comparison module 134 may verify that the user operating the first computing device 110 does indeed possess the second computing device 111, and thus the multi-factor authentication method may be completed in a more secure and fully automatic manner.

Various tasks and specific functions of the modules of the computing system 120 may be performed by additional modules, or may be combined into other module(s) to reduce the number of modules. Further, embodiments of the computer or computer system 120 may comprise specialized, non-generic hardware and circuitry (i.e., specialized discrete non-generic analog, digital, and logic-based circuitry) (independently or in combination) particularized for executing only methods of the present invention. The specialized discrete non-generic analog, digital, and logic-based circuitry may include proprietary specially designed components (e.g., a specialized integrated circuit, such as for example an Application Specific Integrated Circuit (ASIC), designed for only implementing methods of the present invention). Moreover, the solutions proposed by the embodiments of the encrypted verification system 100 are necessarily rooted in computer technology by solving a technical problem with current computer security and verification methods. In particular, current computer security and verification methods, such as 2-factor authentication, using SMS and voice to send verification codes expose the verification codes to a security risk to be intercepted, altered, reused, shared, etc. In addition to exposing the verification codes and comprising the integrity of the authentication process, the current computer security and verification methods, such as 2-factor authentication, using SMS and voice to send verification codes require the user to manually enter the code into one of the computing devices. Manual entry of codes results in human errors in the authentication method which require additional computer resources to be expended to resend the codes to the device. Further, computing resources are used monitoring for the arrival of the codes from the user, as the user may take time to find the user's phone, enter the code correctly using an input device, such as a remote control, etc. Accordingly, embodiments of the encrypted verification system 100 improves computer technology by improving a security of multi-factor authentication methods using secure a private key implemented by a HAL of a smartphone, for example, as well as automates the process because the devices may interact with each other without a user interaction to complete the verification method, thereby saving computer resources by avoiding errors in manual entry of verification codes sent over unsecure communication channels.

Figure 5:
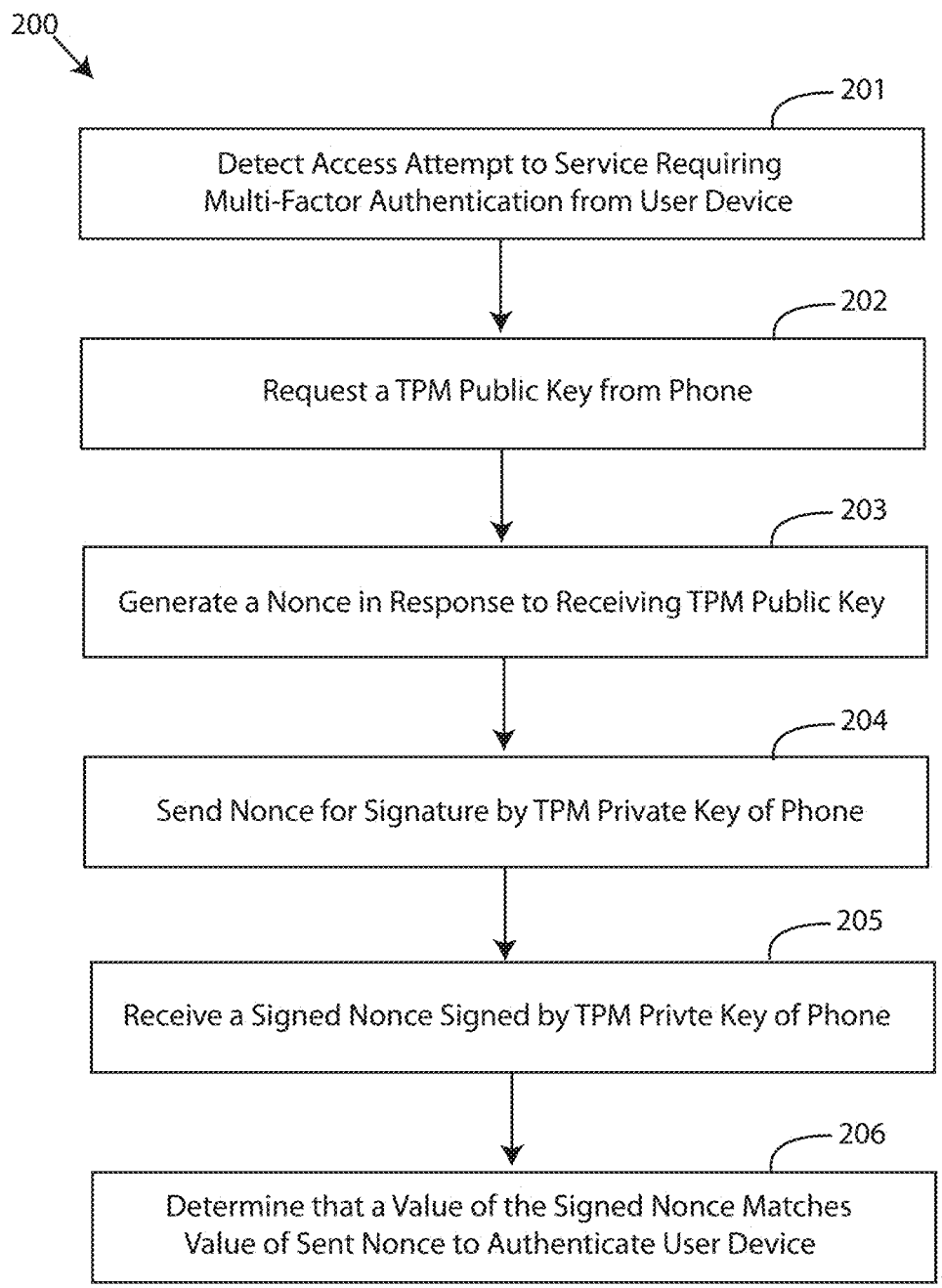
FIG. 5 depicts a flow chart of a method for automatic and secure verification of a user using encrypted phone verification, in accordance with embodiments of the present invention.

Referring now to FIG. 5, which depicts a flow chart of a method 200 for automatic and secure verification of a user using encrypted phone verification, in accordance with embodiments of the present invention. One embodiment of a method 200 or algorithm that may be for automatic and secure verification of a user using encrypted phone verification with the encrypted verification system 100 described in FIGS. 1-4 using one or more computer systems as defined generically in FIG. 6 below, and more specifically by the specific embodiments of FIG. 1.

Embodiments of the method 200 for automatic and secure verification of a user using encrypted phone verification, in accordance with embodiments of the present invention, may begin at step 201 wherein an attempt to access a service requiring a multi-factor authentication is detected. Step 202 requests a TPM public key from a second user computing device 111, such as a smartphone. Step 203 generates a nonce in response to receiving the TPM public key. Step 204 sends the nonce for signature by the TPM private key of the second user computing device 111. Step 205 receives a signed nonce signed by the TPM private key of the TPM implemented by the HAL 170 of the second user computing device 111. Step 206 determines that a value of the signed nonce matches a value of the sent nonce to authenticate the first user computing device 110, thus completing an automatic (i.e. no user intervention once attempt to access is made) and secure multi-factor authentication and/or verification of the first user computing device 110.

Figure 6:
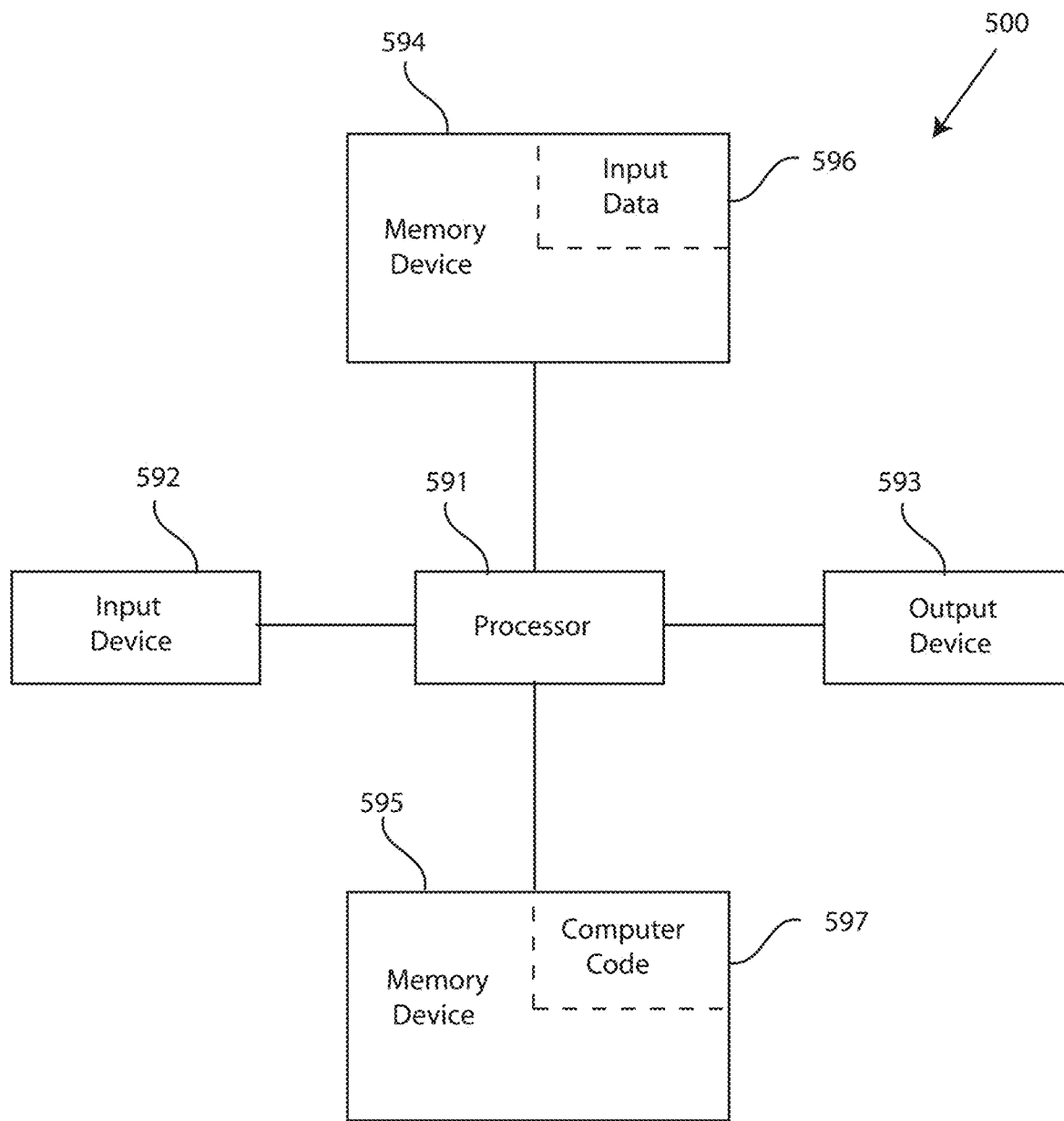
FIG. 6 depicts a block diagram of a computer system for the encrypted verification system of FIGS. 1-4, capable of implementing for automatic and secure verification of a user using encrypted phone verification of FIG. 5, in accordance with embodiments of the present invention.

FIG. 6 depicts a block diagram of a computer system for encrypted verification system of FIGS. 1-4, capable of implementing methods for automatic and secure verification of a user using encrypted phone verification of FIG. 5, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer 500, including executing instructions included in the computer code 597 for the tools and programs capable of implementing a method for automatic and secure verification of a user using encrypted phone verification in the manner prescribed by the embodiments of FIG. 5 using the encrypted verification system 100 of FIGS. 1-4, wherein the instructions of the computer code 597 may be executed by processor 591 via memory device 595. The computer code 597 may include software or program instructions that may implement one or more algorithms for implementing the method for automatic and secure verification of a user using encrypted phone verification, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer-readable program embodied therein and/or having other data stored therein, wherein the computer-readable program comprises the computer code 597. Generally, a computer program product (or, alternatively, an article of manufacture) of the computer system 500 may comprise said computer usable storage medium (or said program storage device).

Memory devices 594, 595 include any known computer-readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 6.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. or in some embodiments the touchscreen of a computing device. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 125 as shown in FIG. 1.

As will be appreciated by one skilled in the art, in a first embodiment, the present invention may be a method; in a second embodiment, the present invention may be a system;

and in a third embodiment, the present invention may be a computer program product. Any of the components of the embodiments of the present invention can be deployed, managed, serviced, etc. by a service provider that offers to deploy or integrate computing infrastructure with respect to encrypted verification systems and methods. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer 500) including one or more processor(s) 591, wherein the processor(s) carry out instructions contained in the computer code 597 causing the computer system to automatically and securely verify/authenticate a user using encrypted phone verification. Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements a method for automatic and secure verification of a user using encrypted phone verification. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for automatic and secure verification of a user using encrypted phone verification.

A computer program product of the present invention comprises one or more computer-readable hardware storage devices having computer-readable program code stored therein, said program code containing instructions executable by one or more processors of a computer system to implement the methods of the present invention.

A computer system of the present invention comprises one or more processors, one or more memories, and one or more computer-readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly release to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
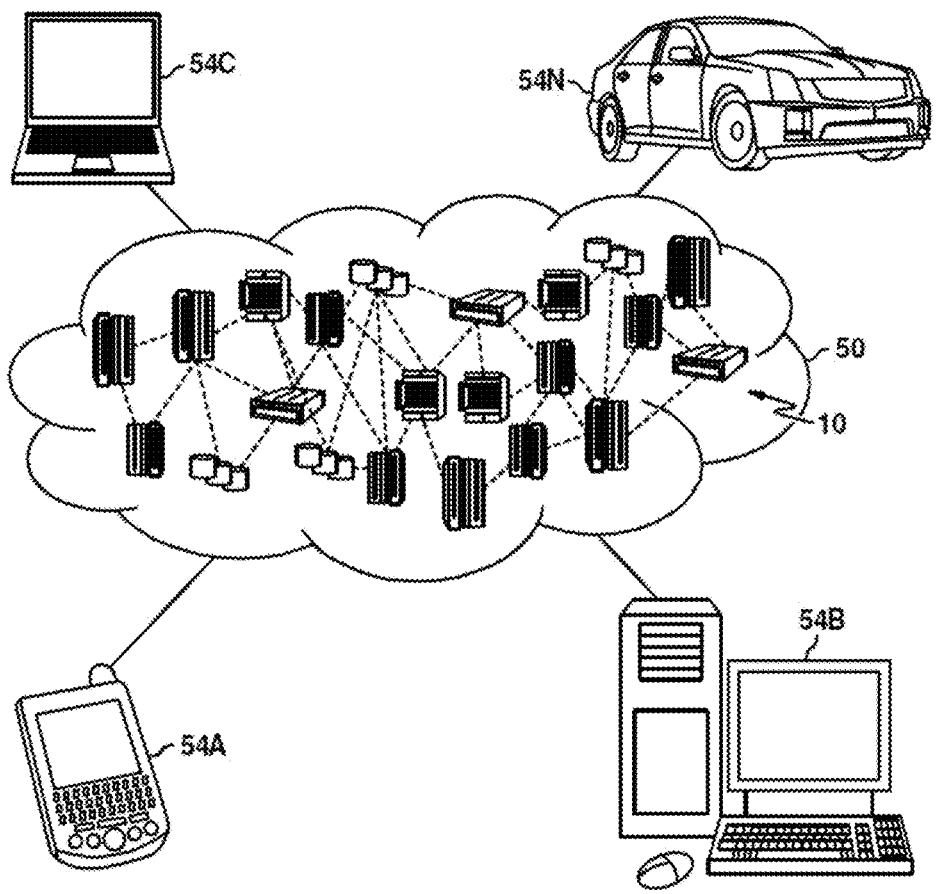
FIG. 7 depicts a cloud computing environment, in accordance with embodiments of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 8 are intended to be illustrative only and that computing nodes 10 and cloud computing environment 50 can communicate with any type of computerized device over any type of network and/or network addressable connection (e.g., using a web browser).

Figure 8:
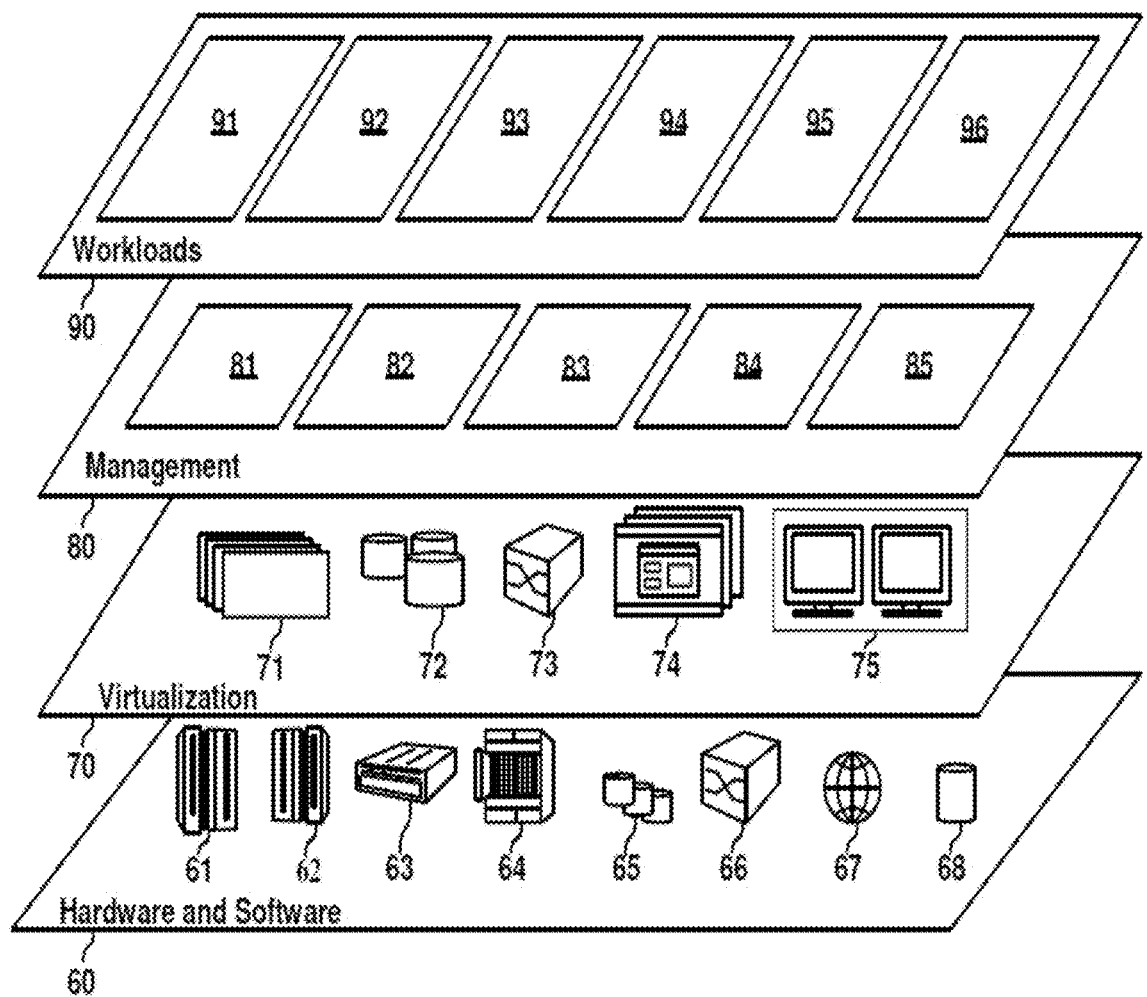
FIG. 8 depicts abstraction model layers, in accordance with embodiments of the present invention.

Referring now to FIG. 8, a set of functional abstraction layers provided by cloud computing environment 50 (see FIG. 7) are shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and encrypted authenticating 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein The claims are as follows:

1. A method for automatic and secure verification of a user using encrypted phone verification, the method comprising:
   detecting, by a processor of a computing system, an attempt to access a service requiring multi-factor authentication from a first user computing device;
   requesting, by the processor, a trusted platform module (TPM) public key from a second user computing device by sending a request to the first user computing device over a first network, wherein, as a function of sending the request:
      the first user computing device requests the TPM public key from the second user computing device over a second network;
      the second user computing device sends the TPM public key to the first user computing device over the second network; and
      the first user computer device sends the TPM public key to the computing system over the first network;
   generating, by the processor, a nonce in response to receiving the TPM public key of the second user computing device;
   sending, by the processor, the nonce for signature by a TPM private key of the second user computing device;
   receiving, by the processor, a signed nonce, wherein the signed nonce is signed by the TPM private key of the second computing device and automatically sent back to the computing system as a function of a signing of the signed nonce;
   decrypting, by the processor, the signed nonce using the TPM public key of the second user computing device; and
   determining, by the processor, that a value of the signed nonce matches a value of the nonce to authenticate the first user computing device and allowing access to the service.

2. The method of claim 1, wherein the second user computing device is a mobile phone having a trusted platform module (TPM) in a hardware abstract layer (HAL), and the nonce is signed by the TPM private key of the TPM in the HAL of the mobile phone.

3. The method of claim 2, wherein the nonce is signed by the TPM private key in the HAL, such that the TPM private key is never exposed.

4. The method of claim 1, wherein sending the nonce for signature includes sending the nonce to the first user computing device over the first network, wherein, as a function sending the nonce to the first user computer device:
- the first user computing device sends the nonce to the second user computing device over the second network;
- the second user computing device returns the signed nonce to the first user computing device over the second network; and
- the first user computing device sends the signed nonce to the computing system over the first network.

5. The method of claim 1, further comprising: registering, by the processor, the TPM public key of the second user computing device with the service for binding the TPM public key to a user account associated with the service.

6. The method of claim 1, wherein the first user computing device and the second user computing device are coupled over the second network, the second network being a short range wireless network.

7. A computer system, comprising:
- a processor;
- a memory device coupled to the processor; and
- a computer readable storage device coupled to the processor, wherein the storage device contains program code executable by the processor via the memory device to implement a method for automatic and secure verification of a user using encrypted phone verification, the method comprising:
  - detecting, by a processor of a computing system, an attempt to access a service requiring multi-factor authentication from a first user computing device;
  - requesting, by the processor, a trusted platform module (TPM) public key from a second user computing device by sending a request to the first user computing device over a first network, wherein, as a function of sending the request:
    - the first user computing device requests the TPM public key from the second user computing device over a second network;
    - the second user computing device sends the TPM public key to the first user computing device over the second network; and
    - the first user computer device sends the TPM public key to the computing system over the first network;
  - generating, by the processor, a nonce in response to receiving the TPM public key of the second user computing device;
  - sending, by the processor, the nonce for signature by a TPM private key of the second user computing device;
  - receiving, by the processor, a signed nonce, wherein the signed nonce is signed by the TPM private key of the second computing device and automatically sent back to the computing system as a function of a signing of the signed nonce;
  - decrypting, by the processor, the signed nonce using the TPM public key of the second user computing device; and
  - determining, by the processor, that a value of the signed nonce matches a value of the nonce to authenticate the first user computing device and allowing access to the service.

8. The computer system of claim 7, wherein the second user computing device is a mobile phone having a trusted platform module (TPM) in a hardware abstract layer (HAL), and the nonce is signed by the TPM private key of the TPM in the HAL of the mobile phone.

9. The computer system of claim 8, wherein the nonce is signed by the TPM private key in the HAL, such that the TPM private key is never exposed.

10. The computer system of claim 7, wherein sending the nonce for signature includes sending the nonce to the first user computing device over the first network, wherein, as a function sending the nonce to the first user computer device:
- the first user computing device sends the nonce to the second user computing device over the second network;
- the second user computing device returns the signed nonce to the first user computing device over the second network; and
- the first user computing device sends the signed nonce to the computing system over the first network.

11. The computer system of claim 7, further comprising: registering, by the processor, the TPM public key of the second user computing device with the service for binding the TPM public key to a user account associated with the service.

12. The computer system of claim 7, wherein the first user computing device and the second user computing device are coupled over the second network, the second network being a short range wireless network.

13. A computer program product, comprising a computer readable hardware storage device storing a computer readable program code, the computer readable program code comprising an algorithm that when executed by a computer processor of a computing system implements a method for automatic and secure verification of a user using encrypted phone verification, the method comprising:
- detecting, by a processor of a computing system, an attempt to access a service requiring multi-factor authentication from a first user computing device;
- requesting, by the processor, a trusted platform module (TPM) public key from a second user computing device by sending a request to the first user computing device over a first network, wherein, as a function of sending the request:
  - the first user computing device requests the TPM public key from the second user computing device over a second network;
  - the second user computing device sends the TPM public key to the first user computing device over the second network; and
  - the first user computer device sends the TPM public key to the computing system over the first network;
- generating, by the processor, a nonce in response to receiving the TPM public key of the second user computing device;
- sending, by the processor, the nonce for signature by a TPM private key of the second user computing device;
- receiving, by the processor, a signed nonce, wherein the signed nonce is signed by the TPM private key of the second computing device and automatically sent back to the computing system as a function of a signing of the signed nonce;
- decrypting, by the processor, the signed nonce using the TPM public key of the second user computing device; and
- determining, by the processor, that a value of the signed nonce matches a value of the nonce to authenticate the first user computing device and allowing access to the service.

14. The computer program product of claim 13, wherein the second user computing device is a mobile phone having a trusted platform module (TPM) in a hardware abstract layer (HAL), and the nonce is signed by the TPM private key of the TPM in the HAL of the mobile phone.

15. The computer program product of claim 1, wherein the nonce is signed by the TPM private key in the HAL, such that the TPM private key is never exposed.

16. The computer program product of claim 13, wherein sending the nonce for signature includes sending the nonce to the first user computing device over the first network, wherein, as a function sending the nonce to the first user computer device:
- the first user computing device sends the nonce to the second user computing device over the second network;
- the second user computing device returns the signed nonce to the first user computing device over the second network; and
- the first user computing device sends the signed nonce to the computing system over the first network.

17. The computer program product of claim 13, further comprising: registering, by the processor, the TPM public key of the second user computing device with the service for binding the TPM public key to a user account associated with the service.

* * * * *